Dec. 4, 1934.  C. ZORZI  1,983,262
COMBINED MOTOR AND COMPRESSOR
Filed March 7, 1931   3 Sheets-Sheet 1

INVENTOR
CARLO ZORZI.
BY
Chas. M. Funkhouser
ATTORNEY

Dec. 4, 1934.  C. ZORZI  1,983,262

COMBINED MOTOR AND COMPRESSOR

Filed March 7, 1931  3 Sheets-Sheet 2

INVENTOR
CARLO ZORZI.
BY Chas. M. Finckbiner
ATTORNEY

Dec. 4, 1934.  C. ZORZI  1,983,262
COMBINED MOTOR AND COMPRESSOR
Filed March 7, 1931  3 Sheets-Sheet 3

INVENTOR
CARLO ZORZI.
BY Chas. M. Funkhouser
ATTORNEY

Patented Dec. 4, 1934

1,983,262

UNITED STATES PATENT OFFICE 1,983,262

COMBINED MOTOR AND COMPRESSOR

Carlo Zorzi, Milan, Italy

Application March 7, 1931, Serial No. 520,937

12 Claims. (Cl. 103—118)

This invention relates to a combined motor and compressor which may be used for a variety of purposes where liquids, vapors, gases or a combination of any two of these are to be moved, pumped or compressed. The present invention is an improvement on that shown in application Serial No. 443,604 filed April 11, 1930, of which this application is a continuation in part.

The invention has for its object the production of a motor-compressor unit having few parts of simple construction, easy to machine and assemble and in which great rigidity and freedom from vibration are assured.

Another object is to provide a motor-compressor unit having a hermetically sealed casing enclosing all of the working parts, which casing is secured together by means of a shaft passing through the center of the unit by which means the usual bolts securing the casings together are eliminated.

Another object is to provide a support for the compressor and for the rotor of the motor which will be integral.

A further object is to provide an improved form of piston assembly for the compressor.

Other objects will be apparent from the following specification, it being understood that changes in the construction shown herein by way of illustration can be readily made by those skilled in the art to adapt the device for direct current instead of for alternating current as shown herein.

As the before-mentioned application describes a motor-compressor constituting the "high side" unit of a refrigerating machine, the present application will also describe, by way of illustration, such a high side, although it will be understood that this unit may be used for many other purposes besides refrigeration.

Figure 1:
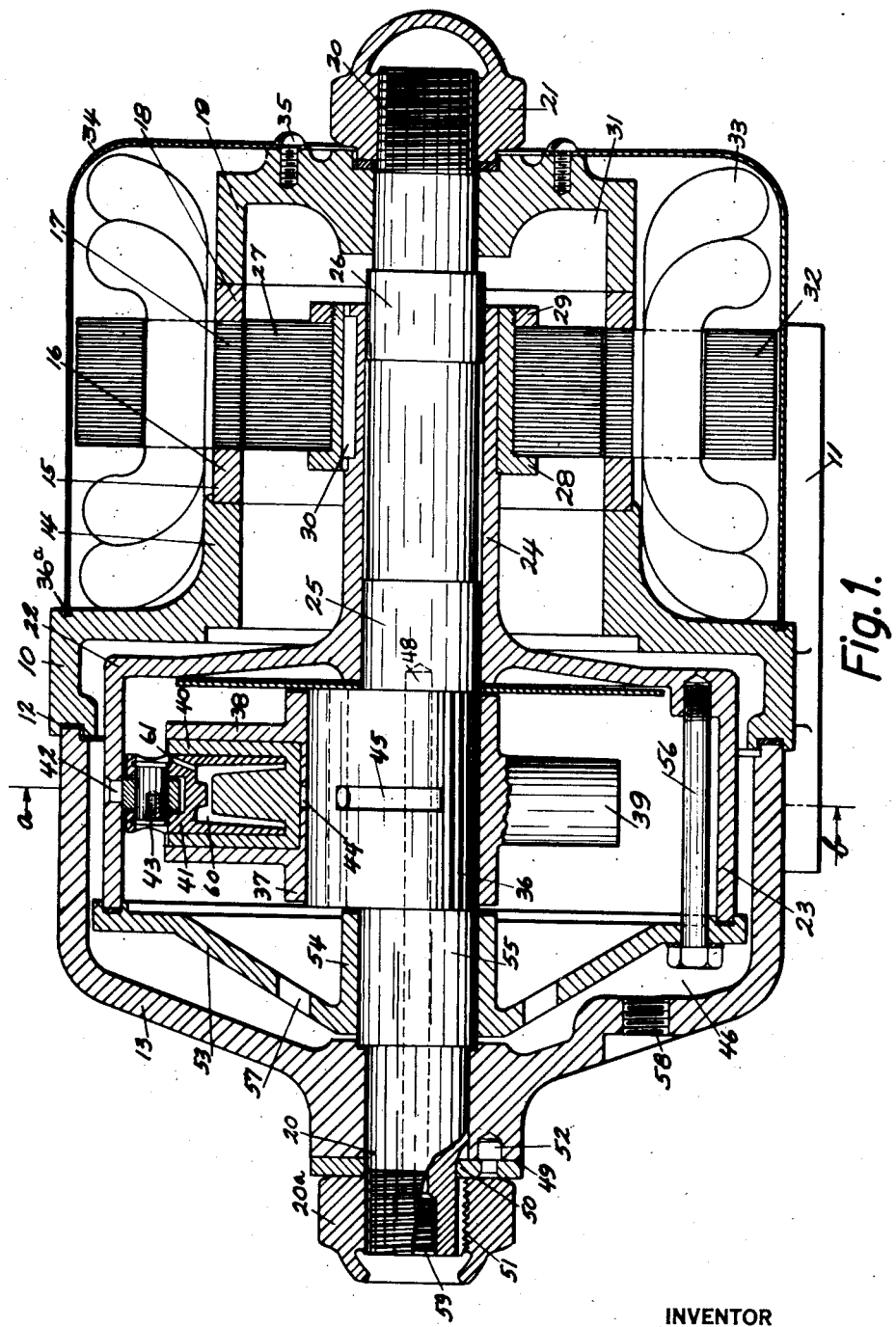
Figure 1 is a vertical longitudinal section of the complete "high side" unit for a refrigerating machine, embodying this invention.
Figure 2:
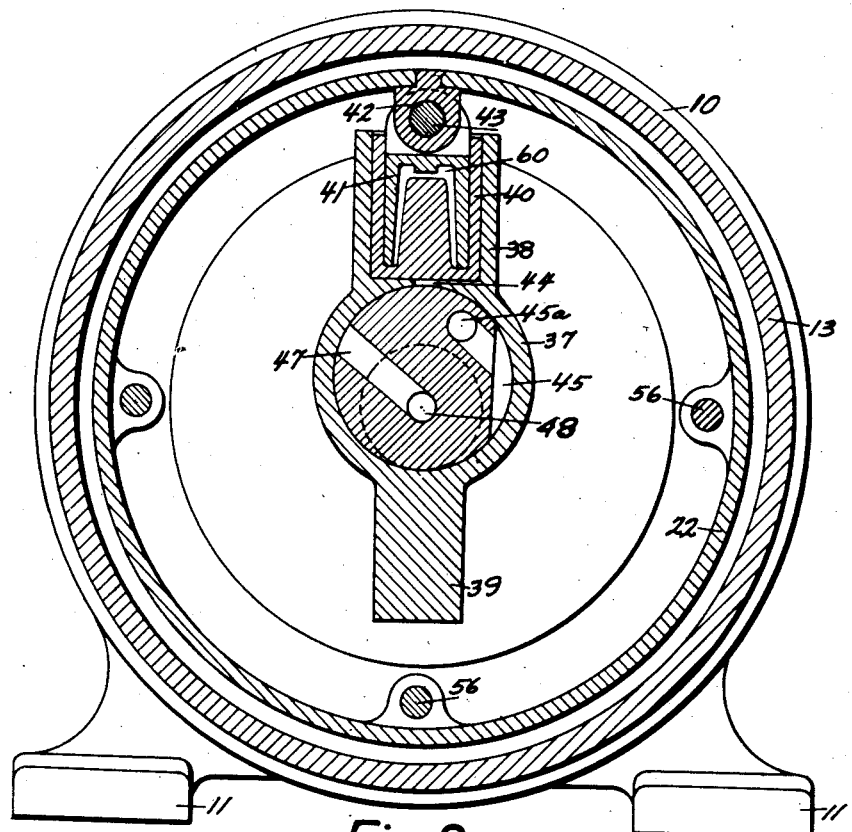
Figure 2 is a sectional view on the line a, b, Figure 1.
Figure 3:
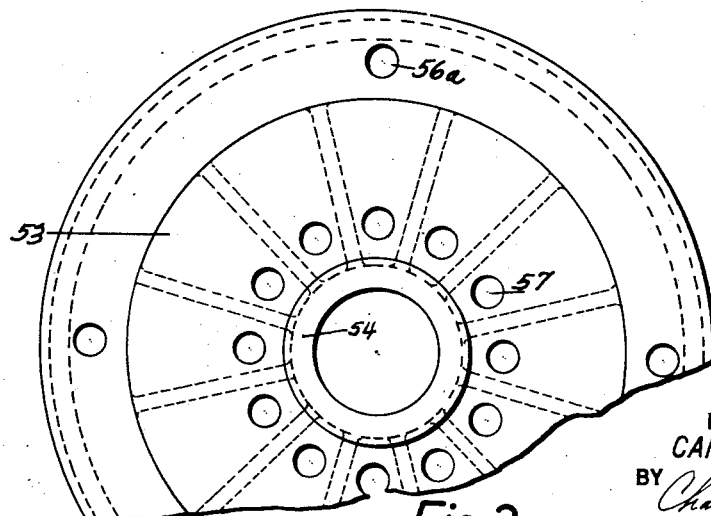
Figure 3 is a detailed view of the flywheel cap.
Figure 4:
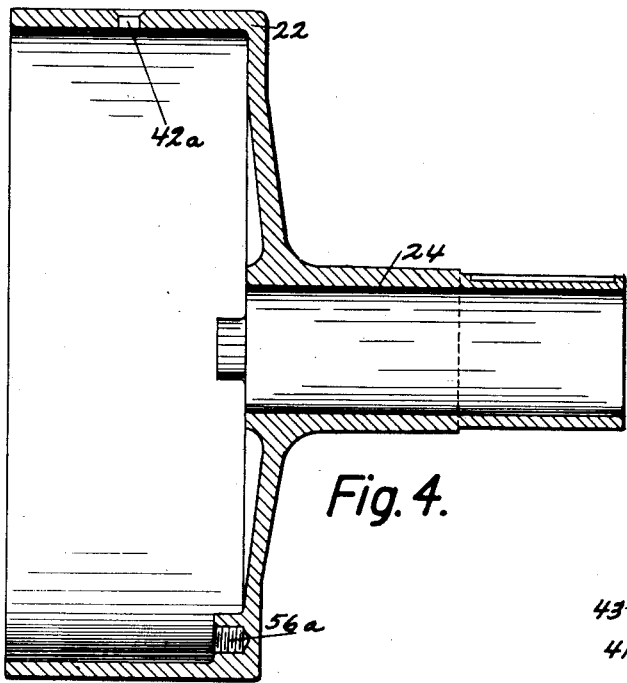
Figure 4 is a view of the combined flywheel and rotor support.

The supporting frame 10 may be provided with one or more feet 11 for supporting the unit. This frame is provided with an annular groove 12 which may have therein a suitable packing ring which is engaged by the annular edge of the casing 13.

The frame 10 has the inwardly projecting flanged portion 14 which has an annular groove therein shown at 15, into which is secured a non-magnetic ring 16, an annulose section of laminations 17 and a second non-magnetic ring 18 and a cap 19, all of said parts being secured to the supporting frame by means of the shaft 20 which passes through the center of the unit, it being secured to the cap 19 by means of the nut 21 and to the casing 13 by means of nut 20a, suitable packing being interposed between said nuts so as to make all joints gas tight and hermetically seal the interior of the unit from the atmosphere except for the suction and pressure ducts or pipes hereinafter referred to.

The shaft 20 supports the combined flywheel and rotor support 22. This has an outwardly extending flanged or rim portion 23 enclosing the compressor mechanism hereinafter described and an oppositely extending portion 24 forming a support for the rotor. The shaft 20 has bearings formed thereon at 25 and 26 and the corresponding portions of the rotor support 24 are formed to fit these bearings.

The rotor for the motor, the laminations of which are indicated at 27, are supported on 24 by any suitable means, such as the flange 28 and nut 29, said flange being held in position on 24 by means of the key 30.

It will be observed that the flanged portion 14 of frame 10 and the non-magnetic rings 16 and 18 and the group of laminations 17 and the cap 19 form a rotor sleeve having therein the rotor chamber 31 enclosing a rotor 27 and on the outside of this rotor sleeve is mounted the stator, the laminations of which are shown at 32, these being provided with suitable windings indicated at 33.

This complete stator may be slipped on and off of the rotor sleeve without opening the rotor chamber 31 and the construction of the rotor, stator and rotor sleeve herein referred to is more fully set forth in the co-pending application hereinbefore mentioned.

In order to protect the stator a casing 34 may be secured to the cap 19, by means of screws 35. The end of this casing may fit into a groove 36a in frame 10 and the casing may be provided with suitable openings in order to ventilate the motor windings.

The shaft 20 is provided with the eccentric 36 upon which is mounted the body casting 37 of the compressor. This casting has a portion 38 forming a cylinder and a portion 39 forming a counterweight for the cylinder and other related rotating parts. Obviously the counterweight 39 is replaced by a second cylinder and it will also be observed that if more than two cylinders are employed the eccentric 36 may be double and two body castings each containing two cylinders are mounted on the double eccentric.

Regardless of the number of cylinders employed, their construction and operation is the same and therefore the construction and operation of a single cylinder only is herein described.

Within the cylinder 38 is placed the free piston 40 and within this free piston, which is hollow as shown, is provided a sleeve 41 which is secured to the rim 23 of the flywheel by means of an eye 42 which is attached to the sleeve by means of a bolt 43.

A port 44 connects the cylinder bore with the eccentric 36 which has formed in it a port 45 which opens up through the ends of the eccentric into the chamber 46 within the casing 13. Another port 47 in the eccentric communicates with duct 48 passing outwardly through shaft 20.

Shaft 20 with its ports is located in proper relation to the cylinder casting by means of a washer 49 having an inwardly extending tongue 50 engaging the keyway 51 in shaft 20. A pin 52 riveted or otherwise secured to the washer 49 extends into the casing 13, thereby securing these parts together in proper relation. By this means the machine can be disassembled and assembled with the parts in the shaft 20 in proper relation to the revolving cylinder.

The flywheel cap or spider 53 has a boss 54 forming a sleeve to fit the bearing 55 on shaft 20. This spider is secured to the flywheel 22 by means of bolts, one of which is shown at 56. By this means, the compressor mechanism is rigidly supported between bearings 25 and 55.

A number of apertures 57 are made in the body of the spider 53 so that the fluid to be compressed may readily pass from chamber 46 and into the compressor by way of ducts 45 and port 44.

A connection may be made at 58 to the chamber 46 and this would be the suction inlet to the compressor. The exhaust or compression pipe from the compressor would connect at 59 in the end of the shaft.

In operation, power being applied to the motor the rotor 27 will revolve, carrying with it the combined flywheel and rotor support 22 having the flange 23 on which is connected the sleeve 41. As this rotates it carries with it the free piston 40 and the body casting 37 of the compressor.

Figure 1 shows the compressor at the beginning of the suction stroke and as the cylinder revolves the gaseous refrigerant or fluid to be compressed will be drawn into the cylinder from the chamber 46 through ports 44 and 45. The port 45 in the face of the eccentric may be a circumferential slot so that the port 44 is in communication therewith until the cylinder finally reaches the outermost point in its travel.

At this point ports 44 and 45 are out of register and the cylinder is sealed. As the piston descends on the compression stroke the refrigerant is compressed in the cylinder until the cylinder finally reaches the point where the port 44 registers with the exhaust or discharge port 47 when the piston will be at the bottom of the compression stroke and the contents of the cylinder will now be discharged through duct 48.

In order to overcome the difficulties heretofore met with in machines of this general character when starting under compression, the sleeve 41 is arranged with a chamber 60 therein which has a port 61 communicating with chamber 46 and when starting the free piston 40 will by reason of friction and the pressure condition that exists on top of it, remain in the bottom of the cylinder in the position shown in Figure 1. The sleeve 41 however is free to reciprocate within the piston and does so, as it is positively driven by the flywheel, but this sleeve and piston 40 are cushioned by reason of the cushioning effect present because of the chamber 60 and limiting port 61. This effect also prevents the piston 40 from operating during the first few revolutions of the compressor thereby enabling the motor to start without the initial load due to the operation of the compressor. As the speed increases the piston 40 by reason of centrifugal force and because of the lessening of the cushioning effect due to the increase in speed, gradually goes into action and regular operation ensues.

Figure 5:
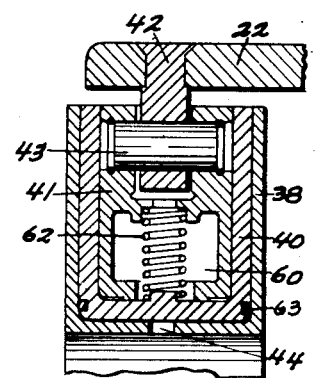
Figure 5 is a sectional view of an alternate form of cylinder and piston construction from that shown in Figure 1.

In Figure 5 an alternate form of piston is shown in which all parts are the same except a spring 62 is provided interposed between the free piston 40 and the sleeve 41. The purpose and action of this spring is the same as that of the chamber 60 and port 61 and it may be used either in combination with the said chamber and port or without these elements.

This improved form of piston construction also contemplates the use of suitable piston rings 63.

Figure 6:
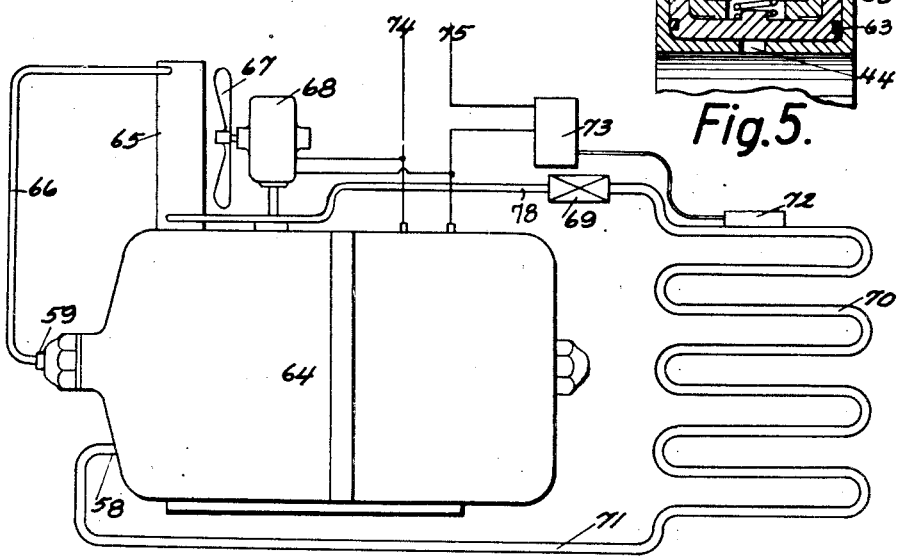
Figure 6 is a diagrammatic view of a complete refrigerating system embodying the invention.

Figure 6 shows a complete refrigeration system, the high side, Figure 1, being indicated as a whole by the numeral 64. The condenser shown diagrammatically at 65 may be of any suitable type and is connected to the compression or exhaust pipe 59 from the compressor by means of the pipe 66. The compressed refrigerant is condensed in the condenser either by natural radiation therefrom or by a forced draft of air from the fan 67 which may be driven by the electric motor 68 which may be mounted adjacent the condenser and on top of the high side 64 along with the condenser or in any other suitable manner.

The pipe 78 connects the condenser to any suitable form of expansion valve indicated diagrammatically at 69 and the liquefied refrigerant is vaporized in the expansion valve and passes into any suitable form of evaporator diagrammatically indicated at 70.

From 70 the expanded refrigerant returns by way of pipe 71 to the suction side 58 of the compressor.

In order to control the operation of the system any suitable form of control may be employed, such as the thermostat 72 operating on the motor control switch diagrammatically indicated at 73 which may also form the motor control in order to take care of overload and starting conditions. As such switches are in common use, they will not be described in detail.

74 and 75 are conductors supplying current through the motor control 73 to the motor within the unit 64 as well as the fan motor 68.

It is obvious that the control 73 may be either enclosed within the unit, that is to say, within the chamber 46 or underneath the stator casing 34, so that the control will form with the motor and compressor an integral part of the high side unit 64.

It is obvious that if the duct 48 were made to communicate with the port 45 and if the duct 45a were made to communicate with the port 47, the suction connection would be made at 59 and the discharge connection would be made at 58, in which event, referring to Figure 6, the pipe 66 would be connected to the unit at 58 instead of 59, and the pipe 71 would be connected to the unit at the point 59 instead of 58. In this event, the compressed gases would be discharged within the flywheel cage or in other words in the cavity confined between the member 22 and the member 53. Any oil or liquid discharged from the compressor would be held around the inner periphery of the rim 23 by centrifugal force and gaseous refrigerant would be discharged into the chamber 46 via the openings 57 in the member 53.

One advantage of this arrangement would be the centrifugal separation of oil from the gaseous refrigerant and the other would be an oil circulating system confined within the rotating cavity which operates as follows.

The thin disc fixed to the stationary shaft 25 and located between the eccentric 36 and the flywheel hub 24 is provided for effecting the oil circulation. Due to the fact that the disc is stationary, the oil within the inner periphery of the annular flange 23, upon coming in contact with the stationary disc, is carried in a thin stream along the surface thereof toward the center of the disc by virtue of the motion of the body of oil. As this oil approaches the center of the disc it is taken up by the eccentric 36 and the hub 37 of the cylinder and thereby lubricates these parts. Some of this oil also works into the intake port due to the fact that it works at lower pressure than the pressure within the chamber 46. Therefore, some oil is forced into the cylinder and lubricates the piston therein.

In the arrangement shown in the drawings, lubricant settles to the bottom of the chamber 46 and all of the moving parts are lubricated by the well known splash system.

What is claimed is:

1. In a motor-compressor unit, an electric motor having a rotor, a fixed shaft and a flywheel revolvably mounted thereon, said flywheel having an integral extended portion forming a support for said motor rotor, a casing enclosing said parts, and a stator outside of said casing for driving said rotor.

2. In a motor-compressor unit, a fixed shaft, a flywheel thereon having an annular integral extending rim portion, a compressor revolvably mounted on said shaft and having a portion secured to said rim, an armature secured to said flywheel adapted to rotate the same, said means including an electric motor rotor, a casing enclosing all said parts, and a stator externally located on the casing for driving said armature.

3. In a motor-compressor unit, a flywheel having an annular extending rim, a spider secured to said flywheel, a compressor housed by said flywheel rim and spider, a casing enclosing said flywheel and compressor and a supporting member securing said casing together and forming bearings on which said flywheel and compressor are rotatably mounted.

4. In combination, a supporting frame, a sleeve comprised in part of annular iron laminations secured thereto and forming therewith a rotor chamber, a shaft secured to said sleeve and serving to clamp the same in fluid tight relation to said frame, an electric motor rotor rotatably supported on said shaft within said chamber, and an electric motor winding for said rotor supported on the exterior of said sleeve.

5. In combination, a supporting frame, a casing, a sleeve having a cap thereon, a shaft passing through said cap and casing and adapted to hold same in fluid-tight relation to said frame, an electric motor stator supported on said sleeve, an electric motor rotor within said sleeve, a member connected to said rotor and extending into said frame, a compressor mounted on said shaft, and means connecting said compressor and rotor.

6. The combination as claimed in claim 5 wherein a part of the wall of said sleeve is composed of an annulus of laminations.

7. In combination, a flywheel having a laterally extending annular portion, an electric motor rotor mounted on said portion, a compressor secured to said flywheel and adapted to rotate therewith, a support for said flywheel and compressor, and a separable fluid-tight casing surrounding and enclosing all said parts, said support also serving as a clamp for securing the casing together in fluid tight relation.

8. In a motor-compressor unit, members forming a hermetically sealed casing, a fixed shaft in said casing having nuts on each end for clamping said members together, a compressor including a member disposed radially to said shaft, means on said shaft to cause the member to reciprocate in a radial path as it rotates around said shaft, and means for rotating said compressor, said means being partly within and without said casing.

9. A motor compressor unit comprising cooperating casings forming a hermetically sealed chamber, one of said casings comprising in part an annulus of iron laminations, a fixed shaft within said chamber, an electric motor having its windings mounted exteriorly of said casings and its rotor within the chamber and rotatable on said shaft, and a compressor within said chamber including a piston and cylinder connected to said rotor and rotatable therewith.

10. The combination as claimed in claim 9 wherein the fixed shaft passes through the walls of the casings and constitutes the means whereby the casings are held together in gas-tight relation.

11. The combination as claimed in claim 9 wherein the fixed shaft is provided with a duct connecting with the compressor cylinder during a portion of each revolution thereof.

12. A motor compressor unit comprising cooperating casings forming a hermetically sealed chamber, one of said casings including an annulus of iron laminations, a fixed shaft within said chamber serving to clamp the casings together and to support all operative parts within the chamber, an eccentric on said shaft, ports in said eccentric, a cylinder rotatably mounted on said eccentric having a port therein adapted to register with said first ports, an electric motor having its windings mounted exteriorly of said casings and its rotor rotatably supported within the casings on said shaft, and a piston adapted to reciprocate in said cylinder connected to said rotor and rotatable therewith.

CARLO ZORZI.